United States Patent [19]

Sugasawa

[11] Patent Number: 4,934,474
[45] Date of Patent: Jun. 19, 1990

[54] FAIL-SAFE STEERING ANGLE CONTROL SYSTEM FOR FOUR-WHEEL STEERABLE VEHICLE

[75] Inventor: Fukashi Sugasawa, Yokohama, Japan

[73] Assignee: Nissan Motor Co., Ltd., Japan

[21] Appl. No.: 305,023

[22] Filed: Feb. 2, 1989

[30] Foreign Application Priority Data

Feb. 6, 1988 [JP] Japan .................................. 63-24945

[51] Int. Cl.⁵ .............................................. B62D 5/06
[52] U.S. Cl. .................................. 180/140; 180/79.1; 364/424.05
[58] Field of Search ................... 364/424.05; 180/143, 180/140, 79.1; 280/91

[56] References Cited

U.S. PATENT DOCUMENTS

| | | | |
|---|---|---|---|
| 4,657,102 | 4/1987 | Kanazawa et al. | 180/140 |
| 4,705,131 | 11/1987 | Shibahata et al. | 180/140 |
| 4,706,771 | 11/1987 | Kawabe et al. | 180/142 |
| 4,706,978 | 11/1987 | Ito | 280/91 |
| 4,706,979 | 11/1987 | Kawabe et al. | 280/91 |
| 4,715,466 | 12/1987 | Ishii et al. | 180/233 |
| 4,716,981 | 1/1988 | Murao | 180/140 |
| 4,716,982 | 1/1988 | Ishii et al. | 180/140 |
| 4,767,588 | 8/1988 | Ito | 364/424 |
| 4,770,264 | 9/1988 | Wright et al. | 180/140 |
| 4,782,907 | 11/1988 | Morishita et al. | 180/140 |

*Primary Examiner*—Mitchell J. Hill
*Attorney, Agent, or Firm*—Leydig, Voit & Mayer

[57] ABSTRACT

A fail-safe steer angle control system includes a front auxiliary steering actuator for controlling a front wheel steering angle in response to a front control signal representing a front wheel auxiliary steering angle, a rear wheel steering actuator for controlling a rear wheel steering angle in response to a rear control signal, a steering angle sensor for sensing the steering wheel angle, and a controller which produces the front control signal based on the steering wheel angle in accordance with a predetermined first relationship, and produces the rear control signal based on the steering wheel angle in accordance with a predetermined second relationship. The controller has a fail-safe section which adjusts the first or second relationship when an abnormal condition is detected in either the front steering system or the rear steering system.

13 Claims, 3 Drawing Sheets

FAIL-SAFE STEERING ANGLE CONTROL SYSTEM FOR FOUR-WHEEL STEERABLE VEHICLE

BACKGROUND OF THE INVENTION

The present invention relates to a steering angle control system for a four-wheel-steerable vehicle, and more specifically to a fail-safe steering angle control system designed to minimize the change in vehicle steering characteristic when an abnormal condition occurs in either the front or rear wheel steering systems.

In a vehicle steering angle control system having a front wheel auxiliary steering system and a rear wheel steering system, as disclosed in U.S. Pat. No. 4,705,131, a fail-safe system detects an abnormal condition in the front and rear steering systems, and makes the front wheel auxiliary steering angle or the rear wheel steer angle equal to zero by stopping the operation of only the abnormal system, i.e., either the front or rear steering system.

However, this conventional fail-safe system, markedly changes the handling characteristic of the vehicle by reducing the controlled steering angle of the abnormal steering system to zero, so that it becomes difficult for the driver to control the vehicle.

SUMMARY OF THE INVENTION

It is an object of the present invention to provide a fail-safe steering angle control system which can perform a fail-safe operation without causing a large change in the vehicle steering characteristics.

According to the present invention, a fail-safe steering angle control system for a vehicle, comprises front control means 301, rear control means 302 and fail-safe means 303, as schematically shown in FIG. 3.

The front control means 301 controls the front wheel steering angle of the vehicle by using a predetermined front control function. The rear control means 302 controls the rear wheel steering angle of the vehicle by using a predetermined rear control function. The fail-safe means 303 is connected with the front and rear control means. If a malfunction is detected in one of the front and rear control means 301 and 302, the fail-safe means 303 adjusts the control function of the control means 301 or 302 in which no malfunction is detected. Preferably, the fail-safe means 303 adjusts the front control function of the front control means if a malfunction is detected in the rear control means, and adjusts the rear control functions of the rear control means if a malfunction is detected in the front control means.

The fail-safe steer angle control system may further comprise sensing means 304 for sensing an operating condition of the vehicle, such as a steering wheel angle, and producing an input signal.

DESCRIPTION OF THE PREFERRED EMBODIMENTS

Figure 1:
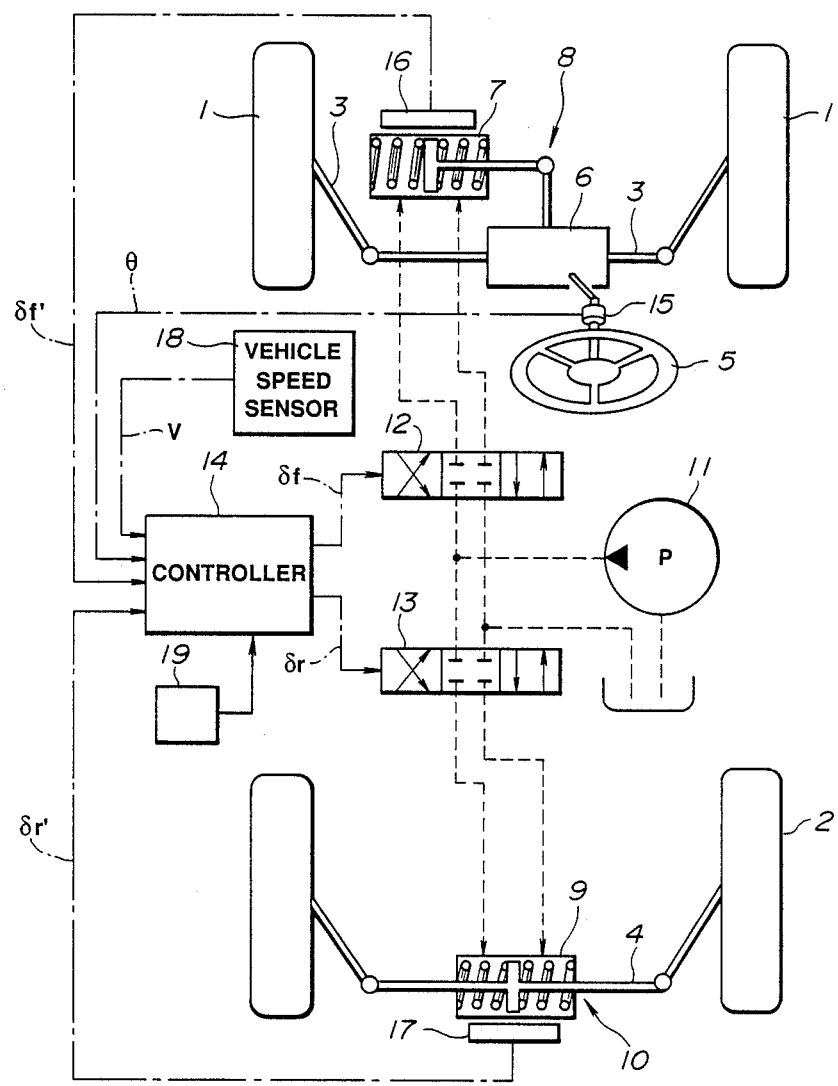
FIG. 1 is a schematic view of a vehicle equipped with an embodiment of a fail-safe steering angle control system according to the present invention.
Figure 2:
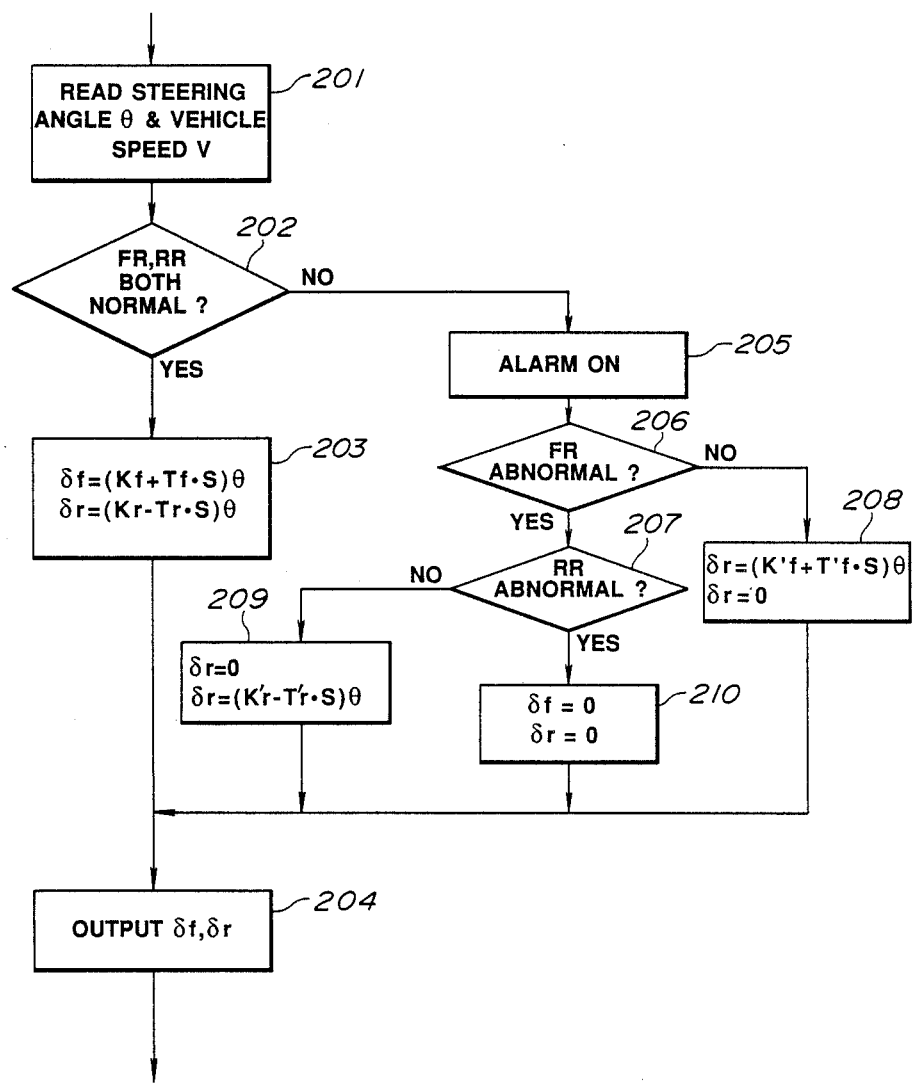
FIG. 2 is a flowchart showing control operations performed by the control system of FIG. 1.
Figure 3:
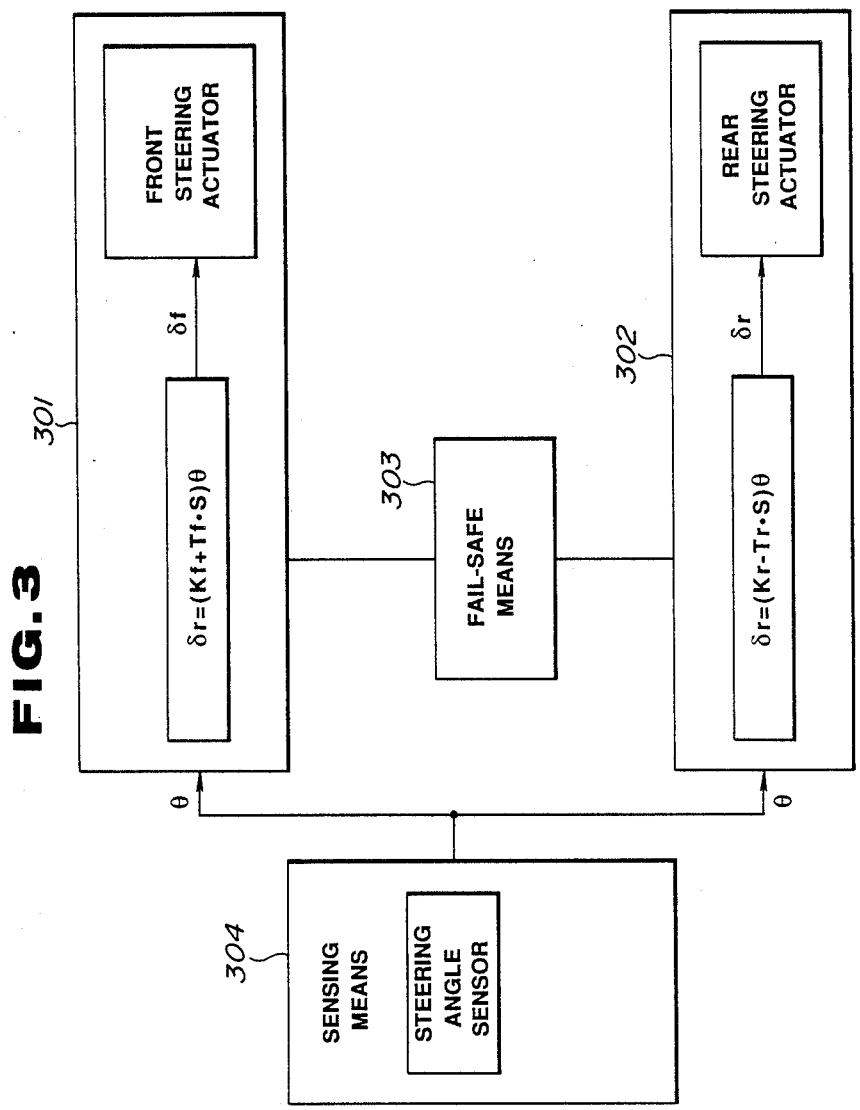
FIG. 3 is a block diagram schematically showing a fail-safe steering angle control system of the present invention.

One embodiment of the present invention is shown in FIGS. 1 and 2.

As shown in FIG. 1, the front wheels 1 of a vehicle are connected with a front steering linkage 3, and the rear wheels 2 are connected with a rear steering linkage 4. Therefore, both the front and rear wheels 1 and 2 are steerable. A steering wheel 5 is connected with a steering gear 6. The steering gear 6 of this embodiment has an unillustrated pinion connected with the steering wheel 5 and an unillustrated rack provided in the front steering linkage between the left and right front wheels 1.

A front wheel auxiliary steering system 8 includes a front wheel auxiliary steering actuator 7 which varies the front wheel steering angle in cooperation with the steering gear 6.

A rear wheel steering system 10 includes a rear wheel steering actuator 9 for varying the rear wheel steering angle.

Front and rear electromagnetic proportional control valves 12 and 13 are respectively connected with the front and rear actuators 7 and 9. Each actuator 7 or 9 is operated by oil pressure supplied from an oil pump 11 through the front or rear control valve 12 or 13.

A controller 14 is connected with the front and rear control valves 12 and 13. The controller 14 delivers a front wheel steering angle control signal $\delta_f$ and a rear wheel steering angle control signal $\delta_r$, respectively, to the front and rear control valves 12 and 13.

Steering angle sensor 15 and vehicle speed sensor 18 are connected with the controller 14. The steering angle sensor 15 is provided in a steering shaft, and senses the steering wheel angle. The steering wheel angle signal $\theta$ produced by the steering angle sensor 15, and a vehicle speed signal V of the vehicle speed sensor 18 are input into the controller 14. A front wheel steering angle sensor 16 is attached to the front actuator 7, and a rear wheel steering angle sensor 17 is attached to the rear actuator 9. The front steering angle sensor 16 senses the displacement of a movable element of the actuator 7, and produces the front feedback steering angle signal $\delta_f'$ and the rear steering angle sensor 17 senses the displacement of a movable element of the rear actuator 9 and produces a rear feedback steer angle signal $\delta_r'$. A selector switch 19 is provided near the driver's seat. With the selector switch 19, the driver can select a sporty mode or a stable mode.

The controller 14 controls the front and rear wheel steering angles by performing the sequence of operations shown in FIG. 2.

First, in step 201, the controller 14 reads the steering angle $\theta$ and the vehicle speed V which are sensed by the sensors 15 and 18.

Next, in step 202, the controller 14 determines whether each of the front wheel auxiliary steering system (FR) 8 and the rear wheel steering system (RR) 10 is properly functioning. For example, the controller 14 compares the front control signal with the front feedback signal and produces a front error detection signal representing the existence of an abnormal condition in the front auxiliary steering system FR when the difference between the front control signal and the front feedback signal is greater than a predetermined level. When the difference between the rear control signal and the rear feedback signal is greater than a predetermined level, the controller 14 produces a rear error detection signal to indicate the presence of an abnormal condition in the rear steering system RR.

If the front auxiliary steering system FR and the rear steering system RR are both normal, the controller 14 proceeds from step 202 to step 203.

In step 203, the controller 14 determines the front wheel auxiliary steering angle $\delta_f$ and the rear wheel steering angle $\delta_r$ in a normal mode. In this embodiment, the controller 14 calculates the front wheel auxiliary steering angle $\delta_f$ and the rear wheel steering angle $\delta_r$ in accordance with the following relationships.

$$\delta_f(S)=(k_f+T_f s)\theta(s) \quad (1)$$

$$\delta_r(S)=(k_r-T_r s)\theta(s) \quad (2)$$

In these equations, $\delta_f(s)$ is the Laplace transform of the front wheel auxiliary steering angle $\delta_f$, $\delta_r(s)$ is the Laplace transform of the rear wheel steering angle $\delta_r$, $\theta(s)$ is the Laplace transform of the steering wheel angle $\theta$, and $k_f$, $k_r$, $T_f$ and $T_r$ are parameters whose values are determined by the specifications of the vehicle and the vehicle speed.

In step 204, the controller 14 delivers the front control signal representing the front wheel auxiliary steering angle $\delta_f$ to the front control valve 12, and the rear control signal representing the rear wheel steering angle $\delta_r$ to the rear control valve 13. As a result, the actual front wheel steering angle is controlled so as to equal the algebraic sum of a basic front wheel steering angle determined by the steering gear 6 alone, and the front wheel auxiliary steering angle $\delta_f$ produced by the actuator 7.

If either or both of the front auxiliary steering system FR and the rear steering system RR is not normal, then the controller 14 proceeds from step 202 to step 205. In step 205, the controller 14 turns on an alarm to indicate the occurrence of an abnormal condition.

After step 205, the controller 14 determines in step 206 whether the front wheel auxiliary steering system FR is abnormal and determines in step 207 whether the rear wheel steering system is abnormal.

If the front wheel auxiliary steering system FR is normal and the rear wheel steering system RR is abnormal, then the controller 14 proceeds from step 206 to step 208. There, the controller 14 makes the rear wheel steering angle $\delta_r$ equal to zero, and determines the front wheel auxiliary steering angle $\delta_f$ in accordance with $$\delta_f(s)=(k_f'+T_f's)\theta(s)$$

by using adjusted parameters $k_f'$ and $T_f'$. Then, the controller 14 outputs the thus-determined $\delta_f$ and $\delta_r$ in step 204. In this case, the fail-safe steering angle control system stops the steering operation of the rear wheel steering system, and adjusts the control function of the front wheel auxiliary steering system which is not abnormal.

If the rear wheel steering system RR is normal but the front wheel auxiliary steering system FR is abnormal, then the controller 14 proceeds from the decision step 207 to step 209. There, the controller 14 makes the front wheel auxiliary steering angle $\delta_f$ equal to zero, and determines the rear wheel steer angle $\delta_r$ in accordance with $$\delta_r(S)=(k_r'-T_r's)\theta(s)$$

by using adjusted parameters $k_r'$ and $T_r'$. Then, the controller 14 outputs the front and rear control signals in step 204 in accordance with the results of step 209. Thus, the fail-safe system puts the front wheel auxiliary steering system FR out of operation, and adjusts the control function of the rear wheel steering system RR.

If the front wheel auxiliary steering system FR and the rear wheel steering system RR are both abnormal, then the controller 14 proceeds from the decision step 207 to step 210 and reduces both the front wheel auxiliary steering angle $\delta_f$ and the rear wheel steering angle $\delta_r$ to zero. Therefore, the vehicle is steered only through the steering gear 6 for the front wheels 1.

In the above-mentioned control functions (1) and (2), the parameters have the following meanings.

$k_f$: Improvement in vehicle stability.

$T_f$, $T_r$: Improvement in vehicle response (transient state characteristic). (However, an unnatural feeling is brought about when the difference between $T_F$ and $T_r$ is too large.)

$k_r$: Control of a steady state gain.

Therefore, the fail-safe system of this embodiment is arranged to improve the response and the stability of the vehicle by adjusting the normal steering system when any of the parameters $k_f$, $T_f$ or $k_r$, $T_r$ are set equal to zero as the result of the detection of an abnormal condition in either the front auxiliary system or the rear steering system.

When the front wheel auxiliary steering system becomes abnormal and $k_f$ is set equal to zero, then this fail-safe system can prevent an undesired decrease of the yaw rate gain of the vehicle by decreasing parameter $k_r$. When the front wheel auxiliary steering system becomes abnormal and $T_f$ is set equal to zero, the fail-safe system can ensure the vehicle response characteristic by increasing parameter $T_r$. Thus, $k_r$ and $T_r$ are adjusted so as to compensate for the malfunction of the front wheel steering system.

When the rear wheel steering system becomes abnormal and $k_r$ is set equal to zero, then this fail-safe system can prevent the vehicle stability from degrading by decreasing parameter $k_f$. When the rear steering system becomes abnormal and $T_r$ is set equal to zero, this fail-safe system can ensure the steering response by parameter $T_f$. Thus, $k_f$ and $T_f$ are adjusted so as to compensate for the malfunction of the rear wheel steering system.

In step 208 of this embodiment, $k_f$ and $T_f$ are both adjusted to $k_f'$ and $T_f'$. However, it is optional to adjust only one of either of $k_f$ or $T_f$. Similarly, it is optional to adjust only one of either $k_r$ or $T_r$ in step 209.

What is claimed is:

1. A fail-safe steering angle control system for a four-wheel-steerable vehicle comprising;
    condition detecting means for detecting an operating condition of the vehicle;
    front control means responsive to the condition detecting means for controlling the front wheel steering angle of the vehicle in accordance with a predetermined front control function which is a first mathematical function of the detected condition;
    rear control means responsive to the condition detecting means for controlling the rear wheel steering angle of the vehicle in accordance with a predetermined rear control characteristic which is a second mathematical function of the detected condition; and fail-safe means for altering the front control function so as to compensate for a malfunction in said rear control means when a malfunction is detected in said rear control means, and altering the rear control function so as to compensate for a malfunction in said front control means when a malfunction is detected in said front control means.

2. A control system according to claim 1 wherein the operating condition is the steering wheel angle $\theta$ of a steering wheel of the vehicle and a sensing means comprises a steering wheel angle sensor for sensing the steering wheel angle $\theta$.

3. A control system according to claim 2 wherein:
the front control function comprises a product of the Laplace transform of the steering wheel angle $\theta$ and a first coefficient;
the rear control function comprises a product of the Laplace transform of the steering wheel angle $\theta$ and a second coefficient; and
said fail-safe means comprises error detecting means for detecting malfunctions in said front and rear control means and coefficient adjusting means for adjusting the first coefficient in the front control function when said error detecting means detects a malfunction in said front control means and adjusting the second coefficient in the rear control function when said error detecting means detects a malfunction in said rear control means.

4. A control system according to claim 3 wherein said coefficient adjusting means comprises means for setting the first coefficient to zero when said error detecting means detects a malfunction of said front control means and for setting the second coefficient to zero when said error detecting means detects a malfunction of said rear control means.

5. A control system according to claim 4 wherein said front and rear control functions are, respectively expressed as $$[\delta_f = (k_f + T_f S)\theta]\delta_f(s) = (k_f + T_f s)\theta(s)$$

$$[\delta_r = (k_r + T_r S)\theta]\delta_r(s) = (k_r + T_r s)\theta(s)$$

where $\delta_f(s)$ is the Laplace transform of a front wheel control angle $\delta_f$, $\delta_r(s)$ is the Laplace transform of a rear wheel control angle $\delta_r$, $\theta(s)$ is the Laplace transform of the steering wheel angle $\theta$, $k_f$ is a front wheel stability parameter, $T_f$ is a front wheel response parameter, $k_r$ is a steady-state gain parameter, $T_r$ is a rear wheel response parameter, and s is a Laplace transform variable.

6. A control system according to claim 5 wherein said fail-safe means comprises means for decreasing the front wheel stability parameter $k_f$ when said error detecting means detects a malfunction in said rear control means and not in said front control means and decreasing the steady-state gain parameter $k_f$ when said error detecting means detects a malfunction in said front control means and not in said rear control means.

7. A control system according to claim 5 wherein said fail-safe means comprises means for increasing the front response parameter $T_f$ when said error detecting means detects a malfunction in said rear control means and not in said front control means and for increasing the rear response parameter $T_r$ when said error detecting means detects a malfunction in said front control means and not in said rear control means.

8. A control system according to claim 4 wherein:
said front control means comprises a front steering actuator for controlling the front wheel steering angle;
said rear control means comprises a rear steering actuator for controlling the rear wheel steering angle; and
said error detecting means comprises a front angle sensor for sensing the displacement of a movable element of said front actuator and producing a front feedback signal, a rear angle sensor for sensing the displacement of a movable element of said rear actuator, and means for comparing the front control signal and the front feedback signal, and comparing the rear control signal and the rear feedback signal.

9. A control system according to claim 8 wherein said front steering actuator is an auxiliary actuator which controls the front wheel steering angle in cooperation with a steering gear.

10. A control system according to claim 5 wherein the parameters $k_f$, $T_f$, $k_r$, and $T_r$ are predetermined functions of the vehicle speed, the control system further comprising a vehicle speed sensor for detecting the vehicle speed and means for calculating the parameters $k_f$, $T_f$, $k_r$, and $T_r$ on the basis of the detected vehicle speed.

11. A fail-safe steering angle control system for a four-wheel-steerable vehicle comprising:
a steering wheel angle sensor for sensing the steering wheel angle $\theta$ of a steering wheel of the vehicle;
a front wheel steering controller comprising a front auxiliary steering actuator connected to a steering gear of the vehicle for producing a front auxiliary steering angle and a front auxiliary actuator controller for controlling the front auxiliary steering actuator according to a front control function $$\delta_f(s) = (k_f + T_f s)\theta(s)$$

wherein $\delta_f(s)$ is the Laplace transform of the front auxiliary steering angle $\delta_f$, $k_f$ is a stability parameter, $T_f$ is a response parameter, and $\theta(s)$ is the Laplace transform of the steering wheel angle $\theta$;
a rear wheel steering controller comprising a rear steering actuator for steering the rear wheels of the vehicle and a rear actuator controller for controlling the rear wheel actuator according to a rear control function $$\delta_r(s) = (k_r + T_r s)\theta(s)$$

wherein $\delta_r(s)$ is the Laplace transform of the rear wheel steering angle $\delta_r$, $k_r$ is a steady-state gain parameter, $T_r$ is a response parameter, and $\theta(s)$ is the Laplace transform of the steering wheel angle $\theta$; and
a fail-safe mechanism comprising error detecting means for detecting a malfunction of the front wheel steering controller or the rear wheel steering controller and altering means responsive to the error detecting means for altering at least one of the parameters $k_f$ and $T_f$ of the front control function when the error detecting means detects a malfunction of the rear wheel steering controller and altering at least one of the parameters $k_r$ and $T_r$ of the rear control function when the error detecting means detects a malfunction of the front wheel steering controller.

12. A fail-safe steering angle control system for a four-wheel-steerable vehicle comprising:
   a steering wheel angle sensor for sensing the steering wheel angle $\theta$ of a steering wheel of the vehicle;
   a front wheel steering controller comprising a front steering actuator for controlling the front wheel steering angle and a front actuator controller for controlling the front steering actuator according to a front control function which is a first mathematical function of the steering wheel angle $\theta$;
   a rear wheel steering controller comprising a rear wheel actuator for steering the rear wheels of the vehicle and a rear actuator controller for controlling the rear steering actuator according to a rear control function which is a second mathematical function of the steering wheel angle $\theta$; and
   a fail-safe mechanism comprising error detecting means for detecting a malfunction of the front wheel steering controller or the rear wheel steering controller and altering means responsive to the error detecting means for altering the front control function so as to compensate for a malfunction of the rear wheel steering controller when the error detecting means detects a malfunction of the rear wheel steering controller.

13. A fail-safe steering angle control system for a four-wheel-steerable vehicle comprising:
   a steering wheel angle sensor for sensing the steering wheel angle $\theta$ of a steering wheel of the vehicle;
   a front wheel steering controller comprising a front steering actuator for controlling the front wheel steering angle and a front actuator controller for controlling the front steering actuator according to a front control function which is a first mathematical function of the steering wheel angle $\theta$;
   a rear wheel steering controller comprising a rear steering actuator for steering the rear wheels of the vehicle and a rear actuator controller for controlling the rear steering actuator according to a rear control function which is a second mathematical function of the steering wheel angle $\theta$; and
   a fail-safe mechanism comprising error detecting means for detecting a malfunction of the front wheel steering controller or the rear wheel steering controller and altering means responsive to the error detecting means for altering the rear control function so as to compensate for a malfunction of the front wheel steering controller when the error detecting means detects a malfunction of the front wheel steering controller.

* * * * *

UNITED STATES PATENT AND TRADEMARK OFFICE
CERTIFICATE OF CORRECTION

PATENT NO. : 4,934,474
DATED : June 19, 1990
INVENTOR(S) : Sugasawa

It is certified that error appears in the above-identified patent and that said Letters Patent is hereby corrected as shown below:

Column 5, lines 41-43, change the formula to the following:

-- $\delta_f(s) = (k_f + T_f s)\theta(s)$ $\delta_r(s) = (k_r + T_r s)\theta(s)$ --.

Signed and Sealed this

Fifth Day of November, 1991

*Attest:*

HARRY F. MANBECK, JR.

*Attesting Officer*      *Commissioner of Patents and Trademarks*